United States Patent [19]

Rosa

[11] 3,854,061
[45] Dec. 10, 1974

[54] MAGNETOHYDRODYNAMIC GENERATOR ARC RESISTANT ELECTRODES

[75] Inventor: Richard J. Rosa, Cambridge, Mass.

[73] Assignee: AVCO Everett Research Laboratory, Inc., Everett, Mass.

[22] Filed: Feb. 21, 1974

[21] Appl. No.: 444,357

[52] U.S. Cl.............. 310/11, 313/346 R, 313/353
[51] Int. Cl. ........................................ H02k 45/00
[58] Field of Search ........ 310/11, 10; 313/353, 352, 313/346

[56] References Cited
UNITED STATES PATENTS

| | | | |
|---|---|---|---|
| 3,311,762 | 3/1967 | Croitoru | 310/11 |
| 3,397,331 | 8/1968 | Burkhard | 310/11 |
| 3,406,300 | 10/1968 | Teno et al. | 310/11 |
| 3,408,528 | 10/1968 | Devime | 313/353 X |
| 3,428,834 | 2/1969 | Yerouchalmi | 313/346 X |
| 3,428,835 | 2/1969 | Dzung | 310/11 |
| 3,432,715 | 3/1969 | Yerouchalmi | 310/11 X |
| 3,462,621 | 8/1969 | Ho | 310/11 |
| 3,487,256 | 12/1969 | DuBois et al. | 313/346 |
| 3,666,982 | 5/1972 | Wiegand, Jr. | 313/346 X |

*Primary Examiner*—Donovan F. Duggan
*Attorney, Agent, or Firm*—Charles M. Hogan; Melvin E. Frederick

[57] ABSTRACT

A magnetohydrodynamic generator includes arc resistant adjacent current carrying discrete electrodes spaced one from another along a wall of the generator duct, particularly the anode electrodes which are at increasing voltages along the direction of gas flow in the duct. Between adjacent electrodes are disposed one or more arc splitting members so that any arcs which may initially form between these electrodes driven by the Hall voltage gradient and which tend to be forced into the duct wall space between the electrodes by the magnetic field are stretched out or split into a series of arcs requiring a greater voltage than available to be sustained and so the arcs extinguish before they can do serious damage to the wall.

9 Claims, 2 Drawing Figures

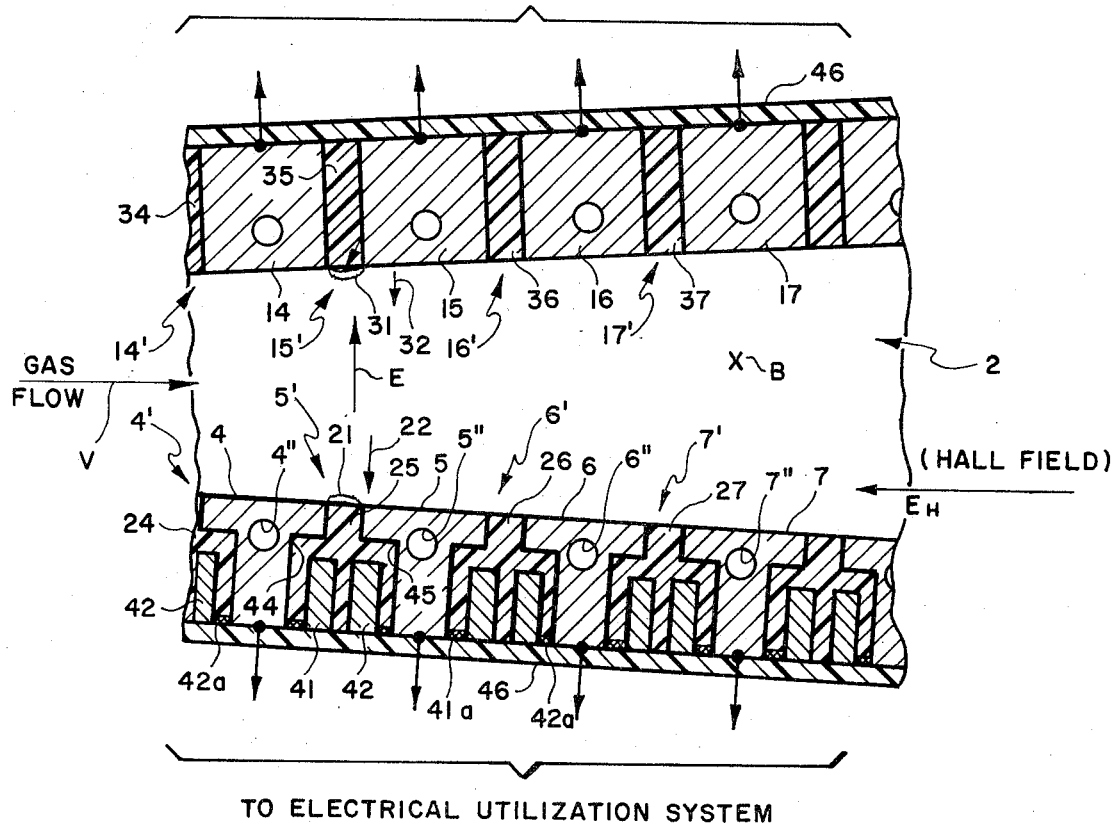

MAGNETOHYDRODYNAMIC GENERATOR ARC RESISTANT ELECTRODES

BACKGROUND OF THE INVENTION

The present invention relates to magnetohydrodynamic (hereinafter abbreviated "MHD") generators.

In general terms, MHD generators produce electric power by movement of electrically conductive fluid relative to a magnetic field. The fluid employed is usually an electrically conductive gas from a high temperature, high pressure source which flows through the generator duct and, by virtue of its movement relative to the magnetic field, induces an electromotive force (emf) between opposed anode and cathode electrodes within the generator duct. The gas may exhaust to a sink, which may simply be the atmosphere; or, in more sophisticated systems, the gas may exhaust to a recovery system including pumping means for returning the gas to the source.

Several different gases may be used, for example, the gas may simply be air, or combination products, or may comprise inert gases such as helium or argon. To promote electrical conductivity, the gases are heated to high temperature and may be seeded with s substance that ionizes readily at the operating temperature of the generator. For seeding purposes, potassium, cesium or another alkali metal vapor may be used. Regardless of the gas used and the manner of seeding, the resulting gases comprise a mixture of electrons, positive ions and neutral atoms which, for convenience, may be termed "plasma."

In an MHD generator, the plasma flows through a magnetic field, which is directed perpendicular to the direction of plasma flow. The movement of the electrically conductive plasma relative to the field produces an emf that is normal both to the direction of flow of the plasma and the magnetic field, the current flowing transversely of the field between sets of anode and cathode electrodes along the side walls of the generator. In such a generator, a separation of positive and negative electrical charges occurs along the length of the plasma stream, producing a potential gradient along the stream known as the Hall field or Hall potential, which promotes longitudinal circulation of current internally of the generator. The emf acts between numerous pairs of opposed anode-cathode electrodes that can be interconnected to accomodate circulation of current transversely of both the magnetic field and the direction of plasma flow. The terminal electrodes, i.e., the first and last electrodes along the length of the duct, may be connected to an external load, making possible circulation of Hall current longitudinally through the plasma and the load circuit. Assuming that the velocity of the plasma and the magnetic field strength are constant over the length of the duct, then the potential difference established transverse of the duct between any given pair of opposed anode-cathode electrodes is substantially constant; however, because of the Hall field existing longitudinally of the duct, the mean potential of the last pair of electrodes is at a more positive level than that of the first pair of electrodes. Thus, the mean potential of any given pair of opposed electrodes is more positive than the mean potential of opposed electrodes that are upstream thereof.

In the MHD generator, it is typical for the potential of staggered, opposed electrodes to be the same. Since these electrodes are at the same potential, they may be electrically interconnected. A structure such as this with the diagonally opposed electrodes interconnected is described in my U.S. Pat. No. 3,148,291, which issued Sept. 8, 1964. In this so-called "Diagonally Connected MHD Generator," as in other types of MHD generators, there is a tendency for the current flowing in the gas to flow preferentially to some electrodes and not to others due, among other things, to random variations in their surface properties or structure. This can lead to concentrations of Hall voltage between certain opposed electrodes and so increase the voltage between adjacent anode or adjacent cathode electrodes.

The maximum allowable potential difference due to the Hall field between adjacent electrodes particularly in the anode set, longitudinally along one wall of the duct, has been found to be in the range of forty volts. This potential difference can be substantially greater where the current flow from the gas to the electrodes is preferential.

Arcs between the adjacent anode electrodes driven by the Hall voltage gradient tend to be forced into the wall of the duct between the anode electrodes by the transverse magnetic field and cause considerable damage to the electrodes and to the insulating wall material between the electrodes. The addition of more anode electrodes will further reduce the Hall voltage between electrodes and, hence, tend to alleviate this problem, but requires smaller electrodes and where the electrodes are liquid cooled, as is generally the case, the additional number of smaller liquid cooled electrodes give rise to many additional problems.

SUMMARY OF THE INVENTION

In view of the foregoing, it will be apparent that a broad object of the invention is to provide an improved MHD generator.

Another object is to provide an MHD generator having, intermediate the terminal electrodes, opposed sets of anode and cathode electrodes that are so constructed that the tendency for destructive arcs to occur between adjacent electrodes in a set is reduced.

Other objects of the invention are to provide a generator characterized by: A moving stream of electrically conductive gas in a duct having an inlet and an outlet, a magnetic field normal to the direction of gas flow, a plurality of discrete electrodes at intervals along opposing walls of the duct, and means functioning with adjacent electrodes for reducing the tendency for destructive arcs to occur between the adjacent electrodes.

In accordance with a principal feature of the present invention, the adjacent electrodes in the anode or cathode set, or in both sets, herein called current carrying electrodes, are so spaced and shaped that one or more arc splitting members are disposed in the wall space between these electrodes. These arc splitting members are located between the electrodes and cause an arc which occurs between two adjacent electrodes through the gas and which may be forced by the transverse magnetic field down into the wall space between the electrodes, to be stretched out or split into two or more series arcs depending upon whether the arc splitting members are non-conductive or conductive. In either case, the voltage required to sustain this type of arcing in the wall space between the electrodes is greatly increased above the available voltage between the electrodes and so the arcs extinguish before they can do serious damage to the electrodes or the wall insulation in between.

The present invention is particularly applicable to the anode electrodes in the MHD generator. The current flow from the gas stream to opposing anode and cathode electrodes tends to flow to the edges of these electrodes at the portions thereof that define part of the duct walls. The transverse magnetic field exerts on this current flow a force called the J X B force which tends to drive the current flow toward the adjacent upstream anode electrode which is at a lower voltage and, hence, there is a tendency for initiation of an arc between adjacent electrodes. This arc is forced by the J X B force into the space between the adjacent electrodes and causes both damage to the insulation between the electrodes and damage to the electrodes.

The current flow to the cathode electrodes, on the other hand is forced by the J X B force away from the adjacent electrode and any arcs that form between adjacent cathode electrodes are driven away from the electrodes by the J X B force which thereby tends to prevent arcs from forming or to extinguish arcs that form. Hence, the teaching of the present invention is more effectively applied to the anode electrodes of an MHD generator than to the cathode electrodes, although these teachings may be applied to both.

Other objects and features of the present invention are understood from the description herein of the specific embodiments which represent the best-known uses of the invention. These embodiments are described herein in conjunction with the following figures.

DESCRIPTION OF THE FIGURES

FIG. 1 is a schematic longitudinal sectional view of a portion of the duct of a generator showing anode electrodes and conductive beam splitting members embodying novel features of this invention; and FIG. 2 is a similar longitudinal sectional view of another embodiment including non-conductive beam splitting members between anode electrodes.

DESCRIPTION OF EMBODIMENTS OF THE INVENTION

In an MHD Hall field generator the gas moving through the generator duct is a slightly ionized plasma having a substantially equal number of positive ions and electrons. Since the electrons are very much lighter than the ions, they have far greater mobility in an electron field and carry the great majority of the current. Thus, the current flow between opposed electrodes is due almost entirely to electron flow. The drift velocity $ve$ of the electrons is given by the following equation:

$$ve = j/n_e e \text{ where:}$$

$j$ = current density
$n_e$ = electron density
$e$ = electron charge

It should be noted, however, that the drift velocity of the electrons is perpendicular to the magnetic field B. This causes an electric field (known as the "Hall field" $E_H$) to be induced along the length of the duct. This field may be calculated from the following equation:

$$E_H = veB = j/n_e e = \omega\tau vB (1-\alpha)$$

where: $\omega$ = electron cyclotron velocity $\tau$ = mean electron collision time $\beta = E/vB$ (non-dimensional) $E$ = electric field between electrodes $B$ = magnetic field Directing attention now to FIG. 1, the gas velocity through the duct shown in cross section in this figure is designated $v$. The $v \times B$ potential gradient is induced as a result of the gas movement through the magnetic field B. This results in an electric field E between the directly opposed anode and cathode electrodes denoted 1 and 2, respectively. However, the Hall field $E_H$ is directed along the gas stream in a direction opposite to the gas flow. The resulting electric field $E_R$ is thus directed upstream at an angle to the direction of movement of the gas stream.

For gases of practical interest for use in MHD generators, the Hall field can be quite large, equal sometimes to two to three times the size of $v \times B$.

On either wall, the Hall field $E_H$ can drive an arc of current flowing upstream and the force on this current is away from the cathode wall and toward the anode wall when the Hall potential between the adjacent electrodes is sufficiently high to sustain an arc. The arc that forms in the gas, such as arc 21, is driven into the wall insulation 24, 25, 26 and 27 between these electrodes by the anode J X B force represented by arrow 22 and can damage this insulation unless it extinguishes.

Furthermore, if an arc such as 31 should form between adjacent cathode electrodes, the cathode J X B force represented by arrow 32 causes the arc to be driven away from the insulation 34 to 37 between these electrodes. Hence, arcing damage at the cathode electrodes is not likely to be as severe as at the anode electrodes.

Arcing between the anode electrodes is inhibited by inserting one or more conductive arc splitters in the insulation 24 to 27 between these electrodes. For example, between electrodes 4 and 5, two electrically conductive arc splitters 41 and 42 may are embedded in insulation 25. Arc splitters 41 and 42 may be insulated from each other and from the anode electrodes or they may be connected to the adjacent electrode through a high resistance, for the purpose of draining off electrostatic charge, such as resistance 41a and 42a shown by way of illustration in FIG. 1. Thus, the arc splitters tend to float at potentials between that of the adjacent electrodes.

In accordance with a preferred feature of the present invention, the adjacent anode electrodes, such as, for example, anode electrodes 4 and 5, may be undercut as at 44 and 45, respectively, as shown in FIG. 1 and the arc splitters 41 and 42 are located in the space between the electrodes and defined in part by the undercuts.

In operation, an arc like arc 21 forced by the J X B forces sufficiently far into the insulation, such as insulation 25, is forced to flow through the conductive arc splitters before the arc reaches, for example, the outside wall 46 of the duct. When the arc reaches these conductive arc splitters, the arc incurs a greater impedance in flowing in and out of each arc splitter at the interface between the arc splitter and the surrounding insulation 25, and so the voltage between the anode electrodes required to sustain the arc may be increased beyond the available voltage and the arc extinguishes.

In accordance with another embodiment of the invention illustrated in FIG. 2, there may or may not be filler insulation 71 and 72 between the adjacent anodes 51, 52 and 53. In the undercuts such as at 61 and 62 of anodes 51 and 52 are located substantially non-conductive arc splitter members 54 and 55. These are preferentially made of highly arc resistant material which is a good heat conductor. A suitable material is boron nitride. Teflon is also suitable although it is not a particularly good heat conductor. Teflon is arc-resistant inasmuch as it does not char or produce an electrically conductive residue when it is heated excessively.

In this embodiment, one arc such as 57 forced down into the undercut by the J X B forces tends to extinguish or is substantially reduced before it reaches the outside wall 56. As the arc is forced into the undercut space, the arc is forced to flow around (in between and over) the arc splitters because it cannot go through them. This lengthens the arcs and so reduces the voltage per unit length to a point where the arc extinguishes before damage can be done to the platic wall 56 and to the electrodes. This wall 56 may be Teflon or it may be reinforced glass fibre material impregnated with silicone resin or other non-conducting and preferably non-charring material.

In both embodiments of the present invention, whether with conductive arc splitters as in FIG. 1 or dielectric or non-conductive arc splitters as in FIG. 2, the result is to substantially increase the voltage between adjacent anode electrodes required to sustain the arc that is forced into the space between the electrodes. When this voltage is increased above the voltage between electrodes (typically about 40 volts), the arc extinguishes.

The anode and cathode electrodes in both embodiments of the invention include one or more coolant passages, such as passages 4″ to 7″ in anode electrodes 4 to 7 and passages 51″ to 53″ in anode electrodes 51 to 53, through which liquid coolant flows to maintain the electrode temperature within prescribed limits. The provisions for this coolant system are considerable and so is the electrical utilization system electrically connected to the anode and cathode electrodes. Hence, it is not satisfactory to reduce arcing tendencies by merely increasing the number of electrodes since one soon passes the point of diminishing returns.

In both embodiments described herein, the insulation between the anode electrodes surrounding the conductive or non-conductive arc splitters is arc resistant material that will not form a short circuit when exposed to an arc and heated excessively. Suitable materials are Teflon, silicon rubber or refractory materials like alumina and magnesia.

As mentioned herein, the J X B forces at the cathode tend to drive the arcs that form between cathode electrodes away from the cathode duct walls. However, it is possible that transient localized reversal of voltage, especially at the ends of the ducts channel, will produce forces tending to drive the cathode arcs into the cathode wall. If this occurs, it may be preferred to incorporate arc splitters of the conductive or non-conductive type disclosed herein between the cathode electrodes as well as between the anode electrodes. Furthermore, in some applications it may be required or desirable to reverse the direction of the magnetic field. At such a reversal, the cathode becomes the anode and vice versa. In that case, the same arc splitting structures would be employed at the cathode as well as the anode.

The embodiments of the present invention described herein represent the best-known uses of the invention and serve to reduce the destructive effects of arcing between adjacent anode or cathode electrodes in an MHD Hall field type generator. Even while following the teachings of this invention, variations and modifications will occur to those skilled in the art without departing from the spirit and scope of the invention set forth in the following claims.

What is claimed is:

1. In an MHD device having a duct for conveying an electrically conductive gas through a transverse magnetic field, said duct having opposed walls, electrode means comprising:
   a. a first set of electrodes spaced one from another disposed along one of said opposed walls, each of said electrodes having a first end surface proximate said gas;
   b. a second set of electrodes spaced one from another disposed along the other of said opposed walls, each of said electrodes having a second end surface proximate said gas;
   c. means electrically interconnecting said first and second set of electrodes to effect current flow between said sets of electrodes through said gas, said current flow producing a Hall potential in the gas along the direction of gas flow and a potential difference between adjacent electrodes; and
   d. arc splitting means comprising an arc splitting member disposed in the space between at least some adjacent electrodes of at least one of said sets of electrodes for increasing the voltage between said adjacent electrodes required to sustain an arc discharge therebetween.

2. An MHD device as in claim 1 wherein:
   a. the arc splitting member is electrically conductive; and
   b. an arc between said adjacent electrodes is split into two or more series arcs.

3. An MHD device as in claim 1 wherein:
   a. the arc splitting member is electrically non-conductive; and
   b. an arc between said adjacent electrodes flows around the arc splitting member and increases the length of the arc.

4. An MHD device as in claim 1 wherein:
   a. said adjacent electrodes extend from the end surfaces thereof away from the wall of the duct;
   b. the space between the adjacent electrodes is wider along the portion thereof extending away from the duct than the space between the end surfaces of said adjacent electrodes at the duct wall; and
   c. the arc splitting member is located in said wider space.

5. An MHD device as in claim 4 wherein:
   a. said adjacent electrodes of said at least one set of electrodes are anode electrodes; and
   b. the transverse magnetic field tends to force the arcs between said anode electrodes into the space therebetween containing the arc splitting member.

6. An MHD device as in claim 4 wherein:
   a. the wider space between adjacent electrodes along the portion thereof extending away from the duct is provided by an undercut of each electrode to define a generally T-shape cross section whereby the juxtaposed undercuts of adjacent electrodes define said wider space.

7. An MHD device as in claim 3 wherein:
a. the arc splitting member is made of arc-resistant material which is a relatively good heat conductor.

8. An MHD device as in claim 2 wherein:
a. the space between adjacent electrodes containing the conductive arc splitting member is substantially filled between the member and the electrodes with an arc-resistant non-conductive material.

9. An MHD device as in claim 3 wherein:
a. the space between adjacent electrodes containing the non-conductive arc splitting member is substantially filled between the member and the electrodes with an arc-resistant non-conductive material.

* * * * *